(12) United States Patent
Dhakate et al.

(10) Patent No.: US 11,307,842 B2
(45) Date of Patent: Apr. 19, 2022

(54) METHOD AND SYSTEM FOR VIRTUAL AGENT UPGRADE USING UPGRADE PROXY SERVICE

(71) Applicant: VMware, Inc., Palo Alto, CA (US)

(72) Inventors: Suchit Dhakate, Bangalore (IN); Narendra Madanapalli, Bangalore (IN); Rahav Vembuli, Bangalore (IN); Padmini Sampige Thirumalachar, Bangalore (IN); Vinothkumar D, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 64 days.

(21) Appl. No.: 16/842,655

(22) Filed: Apr. 7, 2020

(65) Prior Publication Data
US 2021/0311714 A1    Oct. 7, 2021

(51) Int. Cl.
G06F 8/65    (2018.01)
G06F 3/06    (2006.01)
H04L 67/00    (2022.01)
H04L 67/56    (2022.01)

(52) U.S. Cl.
CPC ............. *G06F 8/65* (2013.01); *G06F 3/065* (2013.01); *G06F 3/0619* (2013.01); *G06F 3/0667* (2013.01); *G06F 3/0673* (2013.01); *H04L 67/28* (2013.01); *H04L 67/34* (2013.01)

(58) Field of Classification Search
CPC ..... G06F 8/61; G06F 8/62; G06F 8/63; G06F 8/65
See application file for complete search history.

(56) References Cited

U.S. PATENT DOCUMENTS

| 2004/0003266 A1* | 1/2004 | Moshir | H04L 63/0236 713/191 |
| 2009/0328030 A1* | 12/2009 | Fries | G06F 8/63 717/174 |
| 2011/0145806 A1* | 6/2011 | Cook | G06F 8/656 717/170 |
| 2020/0382450 A1* | 12/2020 | Vaughn | G06N 3/006 |

* cited by examiner

*Primary Examiner* — Duy Khuong T Nguyen
(74) *Attorney, Agent, or Firm* — Loza & Loza, LLP (57) ABSTRACT

System and method for virtual agent upgrade uses an upgrade proxy service that is instantiated in a computing entity when an upgrade request for a virtual agent in the computing entity is received to upgrade the virtual agent based on virtual agent upgrade data from an application server. The upgrade proxy service is then removed from the computing entity after upgrading the virtual agent.

20 Claims, 6 Drawing Sheets

METHOD AND SYSTEM FOR VIRTUAL AGENT UPGRADE USING UPGRADE PROXY SERVICE

BACKGROUND

Software lifecycle management, such as software upgrade, can be a challenging task. With increasing adaptation of cloud computing and cloud storage by enterprises, enterprise information technology (IT) solutions increasingly involve deploying virtual agents through which enterprise services can be provided. For example, virtual agents can be deployed in hosts of distributed systems to control the distributed systems, to collect data in the distributed systems, and/or provide services in the distributed systems. Software upgrade for distributed virtual agents typically require coordination among different IT personnel, such as virtual computing instance administrators and application administrators. For example, for a virtual agent used for application monitoring, a virtual computing instance administrator is needed to manage the virtual agent, while an application administrator is needed to configure the virtual agent to monitor applications. Upgrade of a virtual agent typically requires coordination between the virtual computing instance administrator and the application administrator.

Generally, a centralized application server is used to facilitate lifecycle management of remote virtual agents. Guest credentials are used to verify computing entities (e.g., remote endpoints or hosts) before installing virtual agents in the computing entities. However, it is cumbersome for customers to provide credentials again when upgrading virtual agents after credentials are provided when the virtual agents are installed. Typically, to upgrade a remote virtual agent, an upgrade script is copied to a computing entity in which the virtual agent resides and is being executed, and remote action is executed in the virtual agent to download a new version of the virtual agent and upgrade the virtual agent itself. However, guest credentials are typically required to copy upgrade scripts. In addition, when virtual agent upgrade is in progress, there is no point of contact for an application server to monitor the upgrade status and take necessary actions if needed. Furthermore, in case of virtual agent upgrade failures, the connection from a computing entity in which a virtual agent resides to an application server can be lost, which can leave the computing entity in an unstable state (e.g., a zombie state). Additionally, if a computing entity in which a virtual agent resides becomes unmanageable, or if the connection between an application server and the virtual agent is broken, or if the computing entity is rebooted while the virtual agent upgrade is executed, the virtual agent can be left in an unstable state. Upgrading remote virtual agents running on different platforms (e.g., different operation systems such as different flavors of Windows® and Linux®) and at different scale is also challenging. For example, virtual agent upgrade can fail on some computing entities because of network load in the computing entities, which may be caused by other download or network timeouts, or because of software code or dependencies compatibility issues on platform or operating system (OS). Therefore, there is a need to efficiently and reliably upgrade virtual agents in distributed systems.

SUMMARY

System and method for virtual agent upgrade uses an upgrade proxy service that is instantiated in a computing entity when an upgrade request for a virtual agent in the computing entity is received to upgrade the virtual agent based on virtual agent upgrade data from an application server. The upgrade proxy service is then removed from the computing entity after upgrading the virtual agent.

A computer-implemented method for virtual agent upgrade comprises: receiving an upgrade request for a virtual agent in a computing entity from an application server; in response to the upgrade request, instantiating an upgrade proxy service in the computing entity using the virtual agent; using the upgrade proxy service, obtaining virtual agent upgrade data from the application server; using the upgrade proxy service, upgrading the virtual agent based on the virtual agent upgrade data, and removing the upgrade proxy service from the computing entity after upgrading the virtual agent. In some embodiments, the steps of this method are performed when program instructions contained in a computer-readable storage medium are executed by one or more processors.

A system for virtual agent upgrade comprises memory and one or more processors configured to: receive an upgrade request for a virtual agent in a computing entity from an application server; in response to the upgrade request, instantiate an upgrade proxy service in the computing entity using the virtual agent; using the upgrade proxy service, obtain virtual agent upgrade data from the application server; using the upgrade proxy service, upgrade the virtual agent based on the virtual agent upgrade data, and remove the upgrade proxy service from the computing entity after upgrading the virtual agent.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," "one aspect," "an aspect," "various aspects," or similar language means that a particular feature, structure, or characteristic described in connection with the indicated embodiment is included in at least one embodiment of the present invention. Thus, the phrases "in one embodiment," "in an embodiment," "in one aspect," "in an aspect," "in various aspects," and similar language throughout this specification may, but do not necessarily, all refer to the same embodiment.

Figure 1:
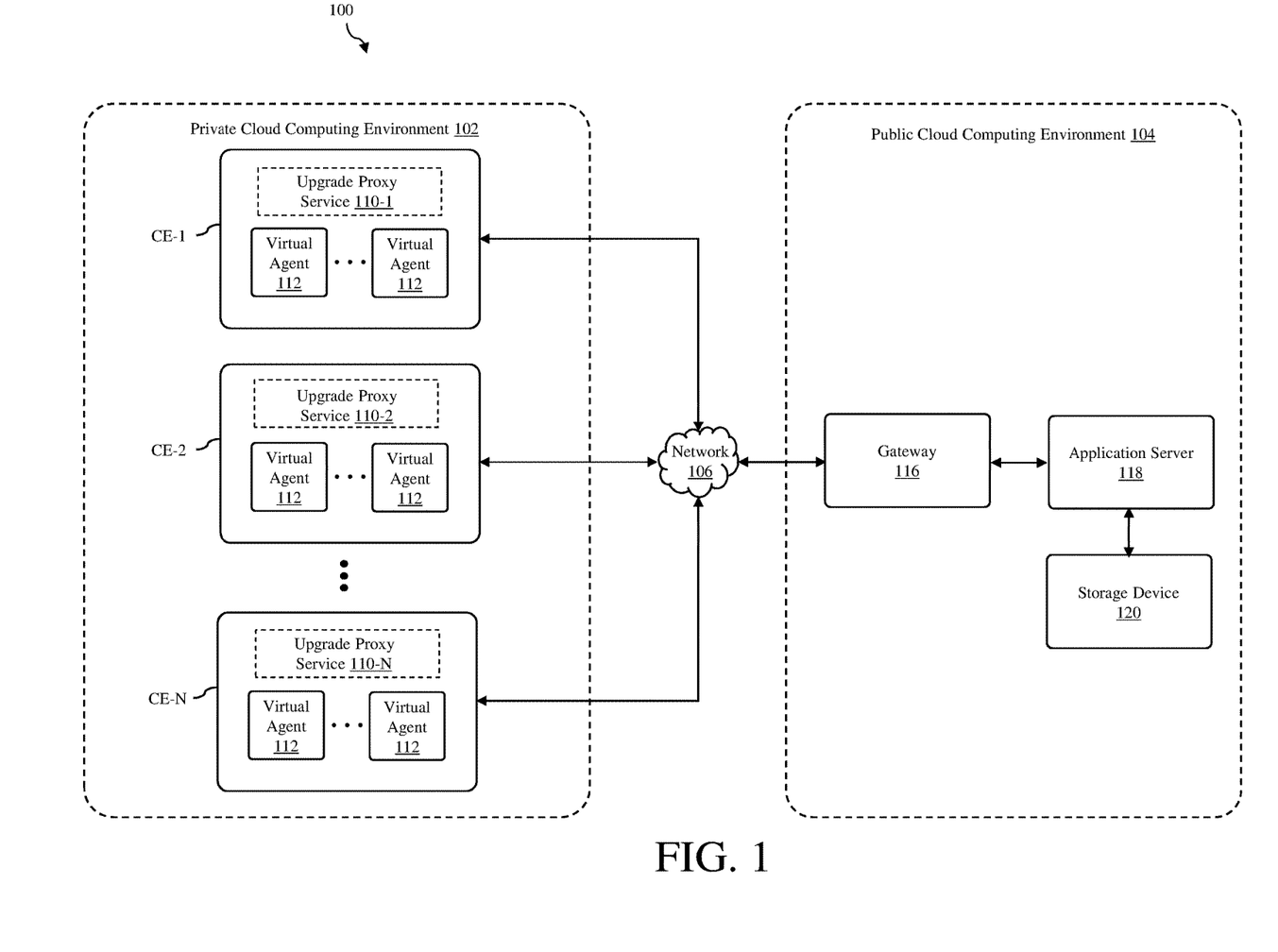
FIG. 1 is a block diagram of a hybrid cloud system that may be used to describe a method and system for virtual agent upgrade in accordance with various aspects of the invention.

Turning now to FIG. 1, a block diagram of a hybrid cloud system 100 in which the present invention may be implemented in accordance with an embodiment of the invention is shown. The hybrid cloud system 100 includes at least one private cloud computing environment 102 and at least one public cloud computing environment 104 that are connected via a network 106. The hybrid cloud system 100 is configured to provide a common platform for managing and executing commands, instructions, and/or workloads seamlessly between the private and public cloud computing environments. In one embodiment, the private cloud computing environment 102 may be controlled and administrated by a particular enterprise or business organization, while the public cloud computing environment 104 may be operated by a cloud computing service provider and exposed as a service available to account holders, such as the particular enterprise in addition to other enterprises. In some embodiments, the private cloud computing environment 102 may be a private or on-premise data center. The hybrid cloud system can be used in cloud computing and cloud storage systems for offering software as a service (SaaS) cloud services. Examples of cloud architectures include the VMware Cloud architecture software, Amazon EC2™ web service, and OpenStack™ open source cloud computing service. SaaS cloud service is a type of software distribution cloud service in which a service provider hosts software applications for customers in a cloud environment.

The private cloud computing environment 102 of the hybrid cloud system 100 includes one or more computing entities CE-1, CE-2, . . . , CE-N, where N is a positive integer, in which virtual agents 112 reside. As used herein, the term "computing entity" refers to any virtual computing instance or software processing entity that can run on a computer system, such as a software application, a software process, a virtual machine (VM), e.g., a VM supported by virtualization products of VMware, Inc., and a software "container", e.g., a Docker container, and/or refer to any computing system, such as a host computer system ("host"), a distributed computing system, or an embedded computing system. The computing entities CE-1, CE-2, . . . , CE-N can be operable to control access to resources (e.g., one or more application servers) by the virtual agents 112 and/or end-users. In some embodiments, the computing entities CE-1, CE-2, . . . , CE-N are remote endpoints that provide interfaces within the hybrid cloud system 100 between one or more application servers and the virtual agents 112. The computing entities CE-1, CE-2, . . . , CE-N can be disposed anywhere within the hybrid cloud system 100. Although the computing entities CE-1, CE-2, . . . , CE-N are shown in FIG. 1 as disposed within the private cloud computing environment 102, in other embodiments, at least one computing entity is disposed in the public cloud computing environment 104. The virtual agents 112 in the computing entities CE-1, CE-2, . . . , CE-N can perform various functions. In some embodiments, the virtual agents 112 in the computing entities CE-1, CE-2, . . . , CE-N provide remote access functionality for software services or applications that may reside in the public cloud computing environment 104. The virtual agents 112 may be any virtual computing instances or software processing entities that can run on a computer system, such as software applications, software processes, virtual machines (VMs), e.g., VMs supported by virtualization products of VMware, Inc., and software "containers", e.g., Docker containers. In some instances, the virtual agents 112 will be described as being virtual machines, although embodiments of the invention described herein are not limited to virtual machines. The virtual agents 112 can be disposed anywhere within the hybrid cloud system 100. Although the virtual agents 112 are shown in FIG. 1 as disposed within the private cloud computing environment 102, in other embodiments, at least one virtual agent 112 is disposed within the public cloud computing environment 104.

The private cloud computing environment 102 of the hybrid cloud system 100 includes computing and/or storage infrastructures to support the computing entities CE-1, CE-2, . . . , CE-N and the virtual agents 112. In some embodiments, the private cloud computing environment 102 includes one or more host computer systems ("hosts"). The hosts may be constructed on a server grade hardware platform, such as an x86 architecture platform. The hardware platform of each host may include conventional components of a computing device, such as one or more processors (e.g., central processing units (CPUs)), system memory, a network interface, storage system, and other I/O devices such as, for example, a mouse and a keyboard. Each host may be configured to provide a virtualization layer that abstracts processor, memory, storage, and networking resources of the hardware platform into virtual computing instances or software processing entities, e.g., software applications, software processes, virtual machines and software containers, which can run concurrently on the same host. For example, virtual machines may run on top of a software interface layer, which can also be referred to as a hypervisor, which enables sharing of the hardware resources of the host by the virtual machines. One example of the hypervisor that may be used in an embodiment described herein is a VMware ESXi™ hypervisor provided as part of the VMware vSphere® solution made commercially available from VMware, Inc. The hypervisor may run on top of the operating system of the host or directly on hardware components of the host. For other types of virtual appliances, the host may include other virtualization software platforms to support those virtual appliances, such as Docker virtualization platform to support software containers.

The private cloud computing environment 102 of the hybrid cloud system 100 communicates with the public cloud computing environment 104 of the hybrid cloud system through the network 106. In some embodiments, the private cloud computing environment 102 includes a gateway device (not shown) configured to provide the computing entities CE-1, CE-2, . . . , CE-N and other devices in the private cloud computing environment 102 with connectivity to external devices via the network 106. The gateway device may be implemented as a virtual computing instance such as a software application, a software process, a VM, or a software container and/or a hardware device (e.g., a router or a switch). The gateway device may manage external public Internet Protocol (IP) addresses for the computing entities CE-1, CE-2, . . . , CE-N and route traffic incoming to and outgoing from the private cloud computing environment and provide networking services, such as firewalls, network address translation (NAT), dynamic host configuration protocol (DHCP), load balancing, and/or virtual private network (VPN) connectivity over the network 106.

The public cloud computing environment 104 of the hybrid cloud system 100 is configured to dynamically provide an enterprise or users of an enterprise with at least one framework in which an administrator of the enterprise may provision the computing entities CE-1, CE-2, . . . , CE-N, and/or install and execute various software services and/or applications in the computing entities CE-1, CE-2, . . . , CE-N. In some embodiments, the public cloud computing environment 104 provides a framework for executing software instructions on remote virtual computing instances or host computers, e.g., the computing entities CE-1, CE-2, . . . , CE-N, deployed in the private cloud computing environment 102, which can be located in customer data centers. Software instructions that can be executed in the computing entities CE-1, CE-2, . . . , CE-N may include operating system (OS) commands that can be executed in operating system shells and/or Representational state transfer (REST) commands that make API calls on addresses provided to the REST commands.

In the embodiment of FIG. 1, the public cloud computing environment 104 includes at least one gateway device 116, at least one application server 118 and at least one optional storage device 120. Although not explicitly shown in FIG. 1, the public cloud computing environment 104 may include hardware resources having computing resources and/or networking resources in which components of the public cloud computing environment 104 reside and execute. The gateway device 116 is configured to provide components of the public cloud computing environment 104 with connectivity to external devices via the network 106. The gateway device 116 may be implemented as a virtual computing instance such as a software application, a software process, a VM, or a software container and/or a hardware device (e.g., a router or a switch). The gateway device 116 may manage external public IP addresses for the public cloud computing environment 104 and route traffic incoming to and outgoing from the public cloud computing environment 104 and provide networking services, such as firewalls, NAT, DHCP, load balancing, and/or VPN connectivity over the network 106. In some embodiments, the gateway device 116 includes an API Gateway that provides an API, which is tailored to each application or client and is responsible for request routing, composition, and protocol translation. In the public cloud computing environment 104, the application server 118 is configured to host one or more software applications. The application server 118 may be implemented as one or more host computer systems ("hosts") and/or one or more virtual computing instances such as software applications, software processes, VMs, or software containers. The hosts may be constructed on a server grade hardware platform, such as an x86 architecture platform. The hardware platform of each host may include conventional components of a computing device, such as one or more processors (e.g., CPUs), system memory, a network interface, storage system, and other I/O devices such as, for example, a mouse and a keyboard. Each host may be configured to provide a virtualization layer that abstracts processor, memory, storage, and networking resources of the hardware platform into virtual computing instances or software processing entities, e.g., software applications, software processes, virtual machines and software containers, which run concurrently on the same host. The application server 118 can be disposed anywhere within the hybrid cloud system 100. Although the application server 118 is shown in FIG. 1 as disposed within the public cloud computing environment 104, in other embodiments, the application server 118 is disposed in the private cloud computing environment 102. The application server 118 and the computing entities CE-1, CE-2, . . . , CE-N may be all disposed in the private cloud computing environment 102 or all disposed in the public cloud computing environment 104. In the public cloud computing environment 104, the storage device 120 is configured to store or host data (e.g., application operational data and/or application status data) for the application server 118. The storage device 120 can be implemented as one or more local storage devices (e.g., one or more hard disks, flash memory modules, solid state disks and optical disks) and/or a storage interface that enables the application server 118 to communicate with one or more network data storage systems. Example of a storage interface is a host bus adapter (HBA) that couples the host to one or more storage arrays, such as a storage area network (SAN) or a network-attached storage (NAS), as well as other network data storage systems.

In the embodiment depicted in FIG. 1, within each of the computing entities CE-1, CE-2, . . . , CE-N, an upgrade proxy service (UPS) 110-1, 110-2, . . . , or 110-N can be instantiated or established to upgrade a corresponding virtual agent 112. For example, each UPS may update an older version of the corresponding virtual agent with a newly available version of the corresponding virtual agent, such as the latest available version of the corresponding virtual agent. The UPSs 110-1, 110-2, . . . , 110-N are configured to communicate with the application server 118, to execute instructions received from the application server 118, and to instantiate upgrades of the virtual agents 112 in the computing entities CE-1, CE-2, . . . , CE-N. In some embodiments, the UPSs 110-1, 110-2, . . . , 110-N are configured to communicate with the application server 118, for example, to receive software updates from the application server 118 and to transmit virtual agent upgrade status information to the application server 118. The UPSs 110-1, 110-2, . . . , 110-N may execute instructions received from the application server 118 and/or pull/request software instance images or files for the virtual agent containers, which can be used to instantiate upgraded versions of the virtual agents 112. The UPSs 110-1, 110-2, . . . , 110-N can be used to upgrading remote virtual agents running on different platforms and at different scale, which results in efficient and reliable virtual agents upgrade in distributed systems. In some embodiments, the UPSs 110-1, 110-2, . . . , 110-N can update all of the virtual agents 212 in the computing entities CE-1, CE-2, . . . , CE-N to a newer version.

Figure 2:
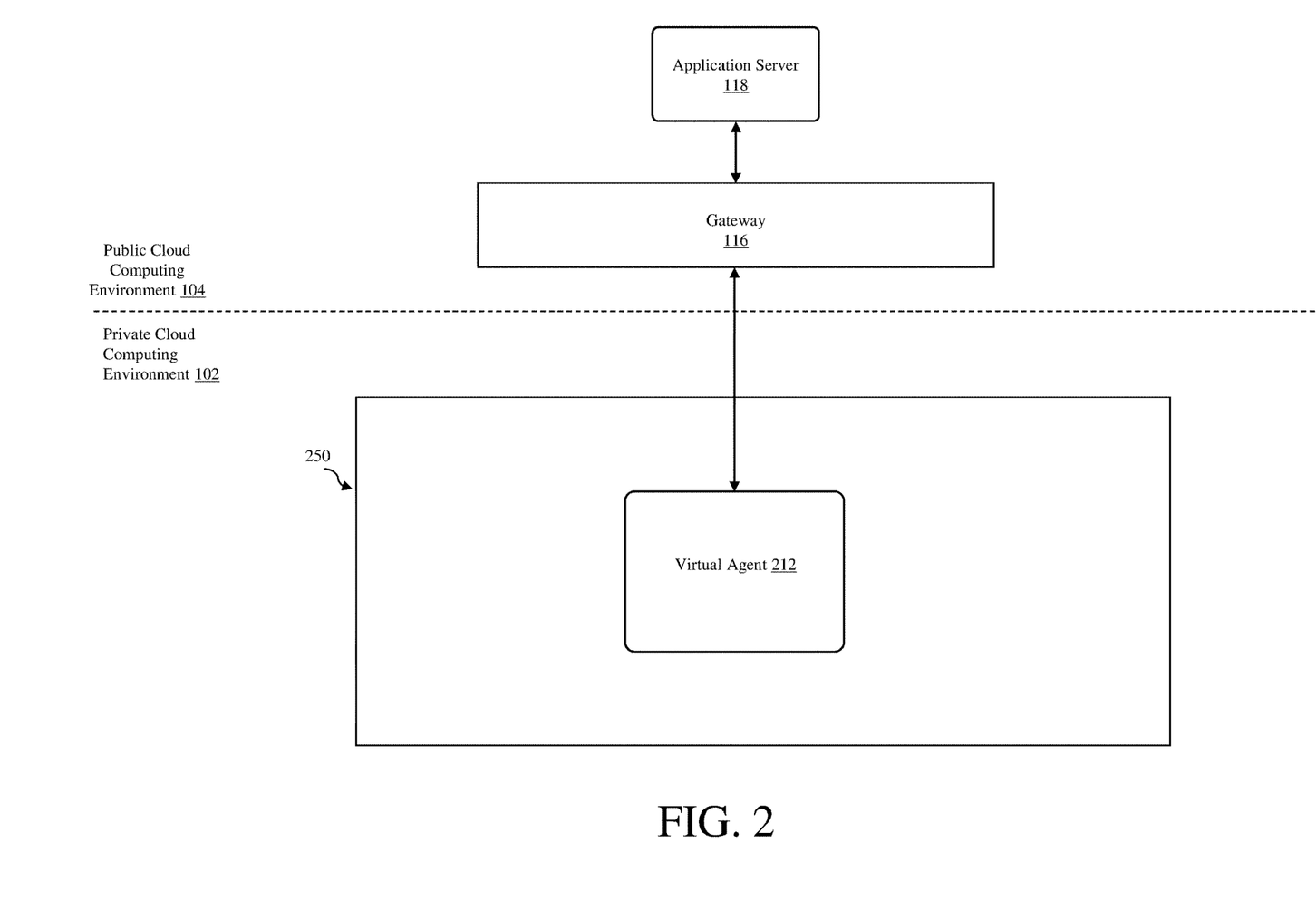
FIG. 2 depicts a computing entity that communicates with an application server in accordance with an embodiment of the invention.

FIG. 2 depicts a computing entity 250 that communicates with the application server 118. The computing entity 250 is an embodiment of the computing entities CE-1, CE-2, . . . , CE-N in the private cloud computing environment 102 of the hybrid cloud system 100 depicted in FIG. 1. In the embodiment depicted in FIG. 2, the computing entity 250 includes at least one virtual agent 212 that communicates with the application server 118 through the gateway 116, for example, to receive one or more software instructions from the application server 118, to transmit one or more software instructions to the application server 118, to receive status information from the application server 118, and/or to transmit status information to the application server 11. The virtual agent 212 is an embodiment of the virtual agents 112 in the private cloud computing environment 102 of the hybrid cloud system 100. Although the application server 118 and the computing entity 250 are located in specific segments of the hybrid cloud system 100 in the embodiment depicted in FIG. 1, in other embodiments, the application server 118 and the computing entity 250 are located in other segments of the hybrid cloud system 100. For example, in some embodiments, the computing entity 250 is located in the public cloud computing environment 104 and the application server 118 is located in the private cloud computing environment 102. In addition, the application server 118 and the computing entity 250 may be located in the same cloud computing environment of the hybrid cloud system 100. For example, in some embodiments, the application server 118 and the computing entity 250 are located in the private cloud computing environment 102. In some other embodiments, the application server 118 and the computing entity 250 are located in the public cloud computing environment 104.

Figure 3:
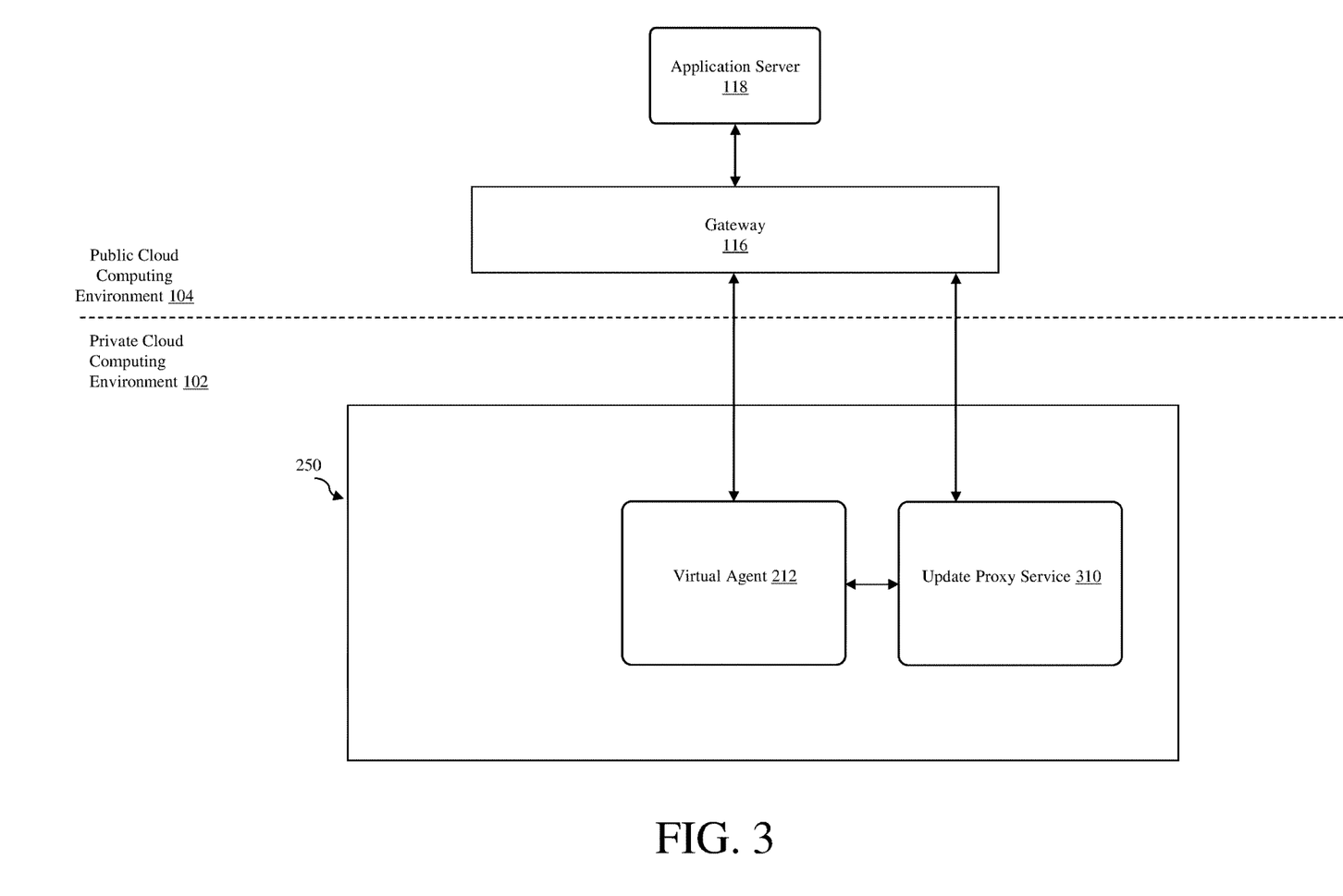
FIG. 3 depicts the computing entity in the embodiment depicted in FIG. 2 after an upgrade proxy service (UPS) is instantiated to upgrade a virtual agent in accordance with an embodiment of the invention.

For software update, the virtual agent 212 can instantiate an upgrade proxy service (UPS) 310 to communicate with the application server 118, as illustrated in FIG. 3, which depicts the computing entity 250 after the UPS 310 is instantiated to upgrade the virtual agent 212. In the embodiment depicted in FIG. 3, the UPS 310 is configured to communicate with the application server 118 through the gateway 116, for example, to receive software updates from the application server 118 and to transmit virtual agent upgrade status information to the application server 118. In some embodiments, the UPS 310 executes instructions received from the application server 118 and/or pulls/requests one or more software instance images or files for a virtual agent container, which can be used to instantiate an upgraded version of the virtual agent 212. In some embodiments, the virtual agent is configured to receive an upgrade request from the application server 118 and, in response to the upgrade request, instantiate the UPS 310 in the computing entity 250. In these embodiments, the UPS 310 obtains virtual agent upgrade data from the application server 118 and upgrades the virtual agent 212 based on the virtual agent upgrade data and after upgrading the virtual agent, the UPS 310 is removed from the computing entity 250 (e.g., all data related to the UPS 310 is removed from the computing entity 250).

In an embodiment, the UPS 310 downloads an upgrade script from the application server 118 and executes the upgrade script in the computing entity 250, for example, to download an upgrade package for the virtual agent 212 from the application server 118. Because the UPS 310 is instantiated in the computing entity 250 by the virtual agent 212, guest credentials do not need to be provided again. Consequently, virtual agent upgrade using UPS can be credentials-free. In addition, when virtual agent upgrade is in progress, the UPS 310 acts as a point of contact for the application server 118 to monitor the upgrade status and take necessary actions if needed. The UPS 310 can maintain the connectivity between the virtual agent 212 and the application server 118 so as to prevent downtime of the virtual agent 212 during agent upgrade. Even in case of virtual agent upgrade failures, the connection from the computing entity 250 in which the virtual agent 212 resides to the application server 118 can be maintained by the UPS 310, which can prevent the computing entity 250 and/or the virtual agent 212 from entering an unstable state (e.g., a zombie state). The UPS 310 can be used to improve or guarantees upgrade atomicity, i.e., at any given point in time during virtual agent upgrade, the computing entity 250 can have an operating virtual agent. For example, if the virtual agent upgrade fails, the UPS 310 can use a backup virtual agent to restore virtual agent capability and bring the virtual agent 212 back to previous working state. Further, the UPS 310 can communicate with the application server 118 to obtain the right upgrade package for the virtual agent 212. For example, the UPS 310 can obtain the latest upgrade package (e.g., the latest runtime) for the virtual agent 212.

Figure 4:
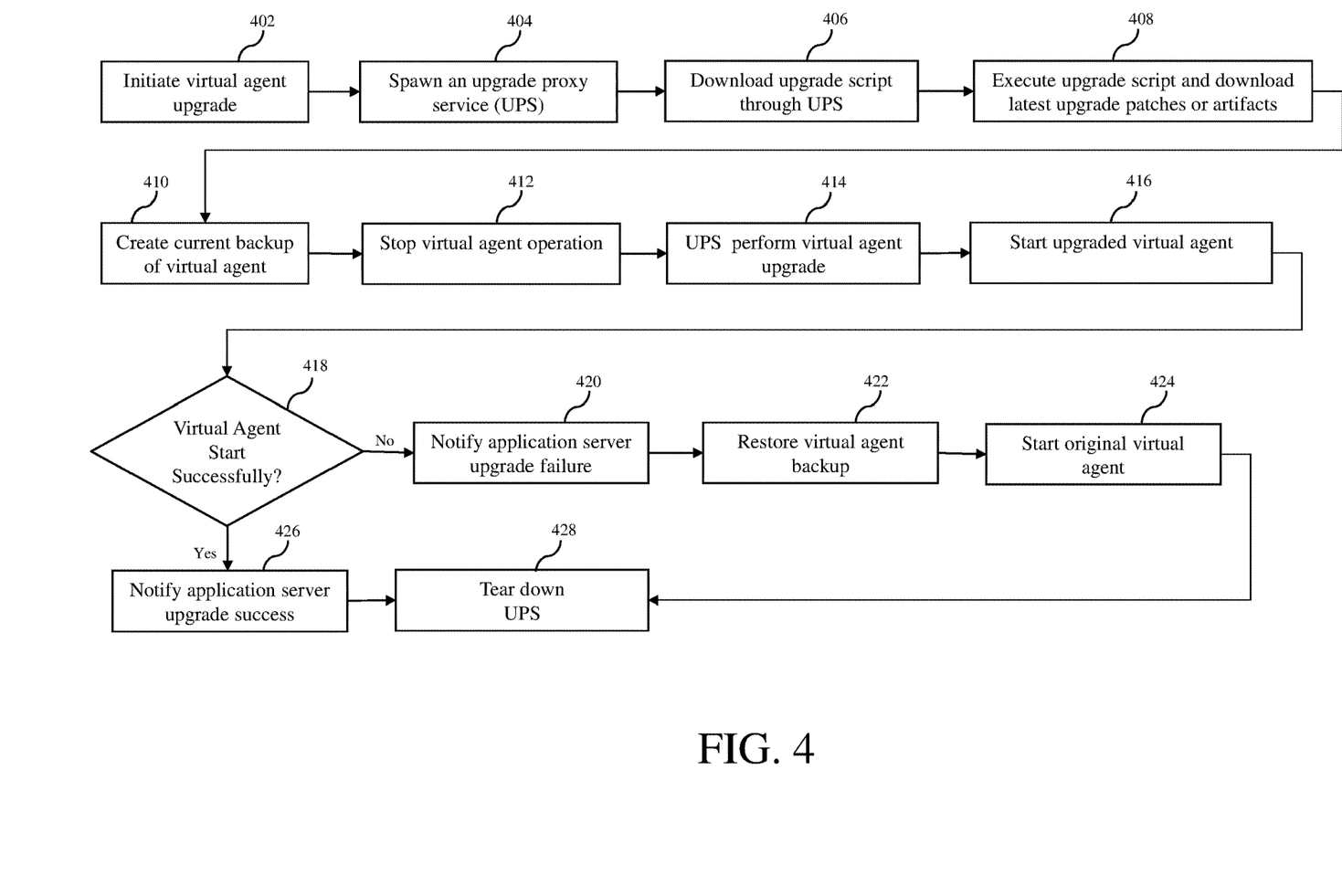
FIG. 4 is a flow diagram of a virtual agent upgrade process that can be implemented in the hybrid cloud system depicted in FIG. 1 in accordance with various aspects of the invention.

FIG. 4 is a flow diagram of a virtual agent upgrade process that can be implemented in the hybrid cloud system 100 depicted in FIG. 1 in accordance with various aspects of the invention. At step 402, an application server (e.g., the application server 118 depicted in FIG. 1) initiates upgrade on at least one virtual agent (e.g., the virtual agent 112 depicted in FIG. 1). Subsequently, at step 404, the virtual agent spawns or instantiates a UPS (e.g., the UPS 110-1, 110-2, . . . , or 110-N depicted in FIG. 1) in a computing entity (e.g., the computing entity CE-1, CE-2, . . . , or CE-N depicted in FIG. 1) in which the virtual agent resides. In some embodiments, the UPS is a software service (e.g., a vanilla OS service) that has capability to connect to the application server and execute actions as directed by the application server. The UPS can understand various personas and ensure that the persona configurations are restored during virtual agent upgrade. The virtual agent has the capability to spawn or instantiate the UPS on demand. Because the UPS is a service or function that is invoked by the virtual agent, computing entity credentials do not need to be provided again. Consequently, virtual agent upgrade using UPS can be credentials-free. In some embodiments, the virtual agent spawns or instantiates the UPS in response an upgrade request from the application server.

At step 406, the UPS downloads an upgrade script (e.g., the latest upgrade script) from the application server. At step 408, the UPS executes the script and downloads required latest upgrade patches or artifacts. At step 410, the UPS creates the current backup of the virtual agent before triggering the upgrade of the virtual agent. The current backup of the virtual agent includes configuration files and additional installed software components.

Next, at step 412, the UPS stops the virtual agent from running or operating. At step 414, the UPS initiates an upgrade of the virtual agent, which may be an upgrade of a component of the virtual agent and/or an update of a configuration of the virtual agent. The UPS can also send status information on upgrade progress to the application server. At step 416, after the upgrade of the virtual agent is done, the UPS starts the upgraded virtual agent and monitor its operation status. At step 418, based on the operation status of the upgraded virtual agent, the UPS determines whether or not the upgraded virtual agent starts successfully. If the upgraded virtual agent does not start or malfunctions with some errors, the UPS notifies the application server that the upgrade of the virtual agent has failed, at step 420, and initiates the restoration of the upgraded virtual agent to the previous working state using the backup virtual agent, at step 422. Subsequently, the UPS starts the previous version of the virtual agent, at step 424, and the UPS is torn down (e.g., goes into self-destruction to remove all of the data related to the UPS), at step 428. If the upgraded virtual agent starts successfully, the UPS sends an upgrade success notification to the application server, at step 426, and the UPS is torn down (e.g., goes into self-destruction), at step 428.

Figure 5:
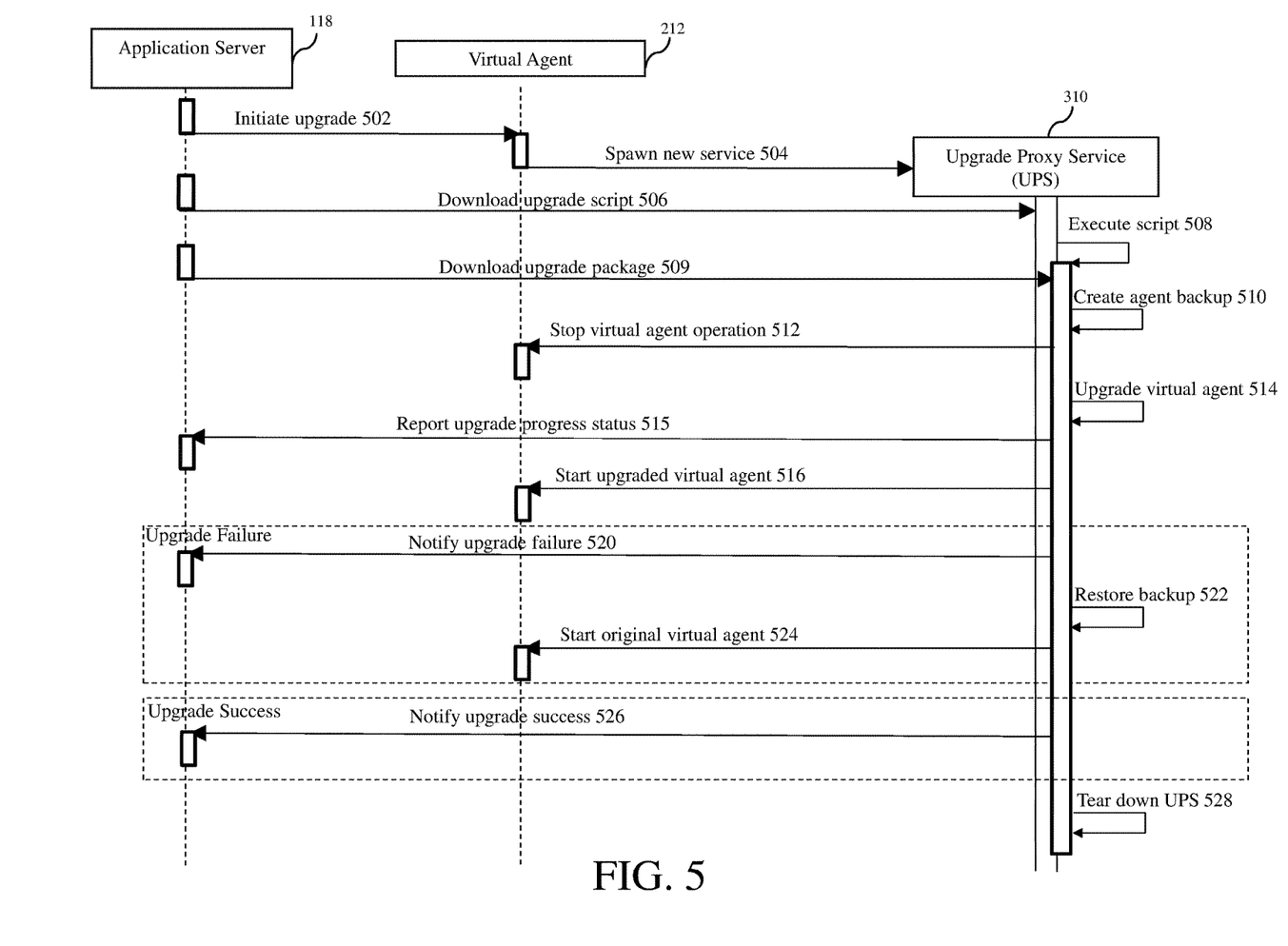
FIG. 5 shows a sequence diagram illustrating an exemplary procedure for virtual agent upgrade in accordance with an embodiment of the invention.

FIG. 5 shows a sequence diagram 500 illustrating an exemplary procedure for virtual agent upgrade. The operations 502-528 in the sequence diagram of FIG. 5 correspond to the operations 402-428 in the flow diagram of FIG. 4. In this virtual agent upgrade procedure, the virtual agent 212 is upgraded based on information provided by the application server 118. In operation 502, the application server 118 initiates upgrade on the virtual agent 212, for example, by sending an upgrade request to the virtual agent 212. In operation 504, the virtual agent 212 spawns or instantiates the new UPS 310. In operation 506, the UPS 310 downloads an upgrade script from the application server 118. In operation 508, the UPS 310 executes the upgrade script and downloads one or more upgrade patches or artifacts in operation 509. In operation 510, the UPS 310 creates the current backup of the virtual agent 212 before triggering the upgrade of the virtual agent 212. The current backup of the virtual agent 212 may include configuration files and additional installed software components. In operation 512, the UPS 310 stops the virtual agent 212 from running. In operation 514, the UPS 310 initiates an upgrade of the virtual agent 212, which may be an upgrade of a component of the virtual agent 212 and/or an update of a configuration of the virtual agent 212. In operation 515, the UPS 310 transmits upgrade progress status information to the application server 118. In operation 516, after the upgrade of the virtual agent 212 is done, the UPS 310 starts the upgraded virtual agent and monitor its operation status. Based on the operation status of the upgraded virtual agent, the UPS 310 determines whether or not the upgraded virtual agent starts successfully. If the upgraded virtual agent does not start or malfunction with some errors, the UPS 310 notifies the application server 118 that the upgrade of the virtual agent has failed in operation 520 and initiates the restoration of the virtual agent to previous working state using the backup in operation 522. Subsequently, the UPS 310 starts the previous version of the virtual agent in operation 524 and the UPS is torn down (e.g., goes into self-destruction to remove all of the data related to the UPS) in operation 528. If the upgraded virtual agent starts successfully, the UPS 310 sends an upgrade success notification to the application server 118 in operation 526 and the UPS is torn down (e.g., goes into self-destruction) in operation 528.

Figure 6:
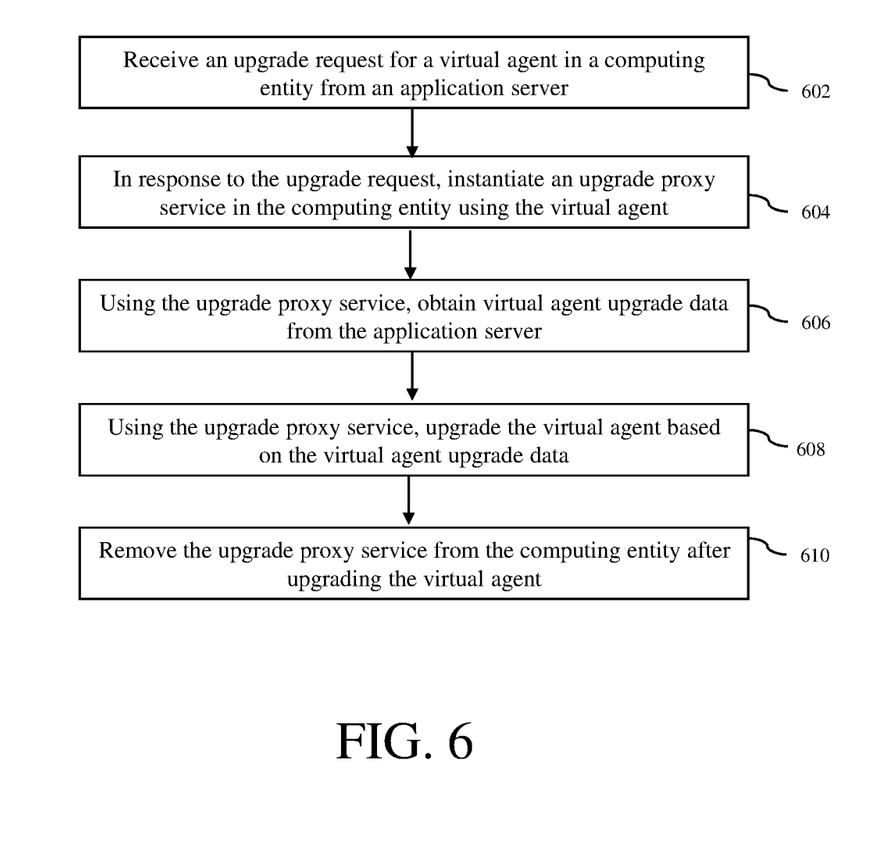
FIG. 6 is a flow diagram of a computer-implemented method for virtual agent upgrade in accordance with an embodiment of the invention.

A computer-implemented method for virtual agent upgrade in accordance with an embodiment of the invention is described with reference to a flow diagram of FIG. 6. At block 602, an upgrade request for a virtual agent in a computing entity is received from an application server. At block 604, in response to the upgrade request, an upgrade proxy service is instantiated in the computing entity using the virtual agent. At block 606, using the upgrade proxy service, virtual agent upgrade data is obtained from the application server. At block 608, using the upgrade proxy service, the virtual agent is upgraded based on the virtual agent upgrade data. At block 610, the upgrade proxy service is removed from the computing entity after upgrading the virtual agent.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for virtual agent upgrade, the method comprising:
   receiving an upgrade request for a virtual agent in a computing entity from an application server;
   in response to the upgrade request, instantiating an upgrade proxy service in the computing entity by the virtual agent in the computing entity;
   using the upgrade proxy service, obtaining virtual agent upgrade data from the application server;
   using the upgrade proxy service, upgrading the virtual agent based on the virtual agent upgrade data, wherein the upgrade proxy service acts as a point of contact for the application server to monitor an upgrade status of the virtual agent when a virtual agent upgrade is in progress; and
   removing the upgrade proxy service from the computing entity after upgrading the virtual agent.

2. The method of claim 1, wherein obtaining the virtual agent upgrade data from the application server comprises using the upgrade proxy service, downloading an upgrade script from the application server.

3. The method of claim 2, wherein obtaining the virtual agent upgrade data from the application server further comprises executing the upgrade script in the computing entity using the upgrade proxy service and downloading an upgrade package for the virtual agent from the application server.

4. The method of claim 3, wherein upgrading the virtual agent based on the virtual agent upgrade data comprises using the upgrade proxy service, upgrading a component or a configuration of the virtual agent based on the upgrade package.

5. The method of claim 3, further comprising, using the upgrade proxy service, creating a backup of the virtual agent before upgrading the virtual agent.

6. The method of claim 3, further comprising, using the upgrade proxy service, stopping the virtual agent from operating.

7. The method of claim 3, further comprising, using the upgrade proxy service, transmitting virtual agent upgrade status information to the application server.

8. The method of claim 3, further comprising after upgrading the virtual agent, starting the upgraded virtual agent and monitoring an operation status of the upgraded virtual agent using the upgrade proxy service.

9. The method of claim 8, further comprising transmitting an upgrade success notification to the application server from the upgrade proxy service when the upgraded virtual agent starts successfully.

10. The method of claim 8, further comprising transmitting an upgrade failure notification to the application server from the upgrade proxy service when the upgraded virtual agent does not start successfully.

11. The method of claim 10, further comprising initiating restoration of the upgraded virtual agent using a backup of the virtual agent when the upgraded virtual agent does not start successfully.

12. The method of claim 10, further comprising starting a previous version of the virtual agent.

13. A non-transitory computer-readable storage medium containing program instructions for virtual agent upgrade, wherein execution of the program instructions by one or more processors causes the one or more processors to perform steps comprising:
   receiving an upgrade request for a virtual agent in a computing entity from an application server;
   in response to the upgrade request, instantiating an upgrade proxy service in the computing entity by the virtual agent in the computing entity;
   using the upgrade proxy service, obtaining virtual agent upgrade data from the application server;
   using the upgrade proxy service, upgrading the virtual agent based on the virtual agent upgrade data, wherein the upgrade proxy service acts as a point of contact for the application server to monitor an upgrade status of the virtual agent when a virtual agent upgrade is in progress; and
   removing the upgrade proxy service from the computing entity after upgrading the virtual agent.

14. The non-transitory computer-readable storage medium of claim 13, wherein obtaining the virtual agent upgrade data from the application server comprises using the upgrade proxy service, downloading an upgrade script from the application server.

15. The non-transitory computer-readable storage medium of claim 14, wherein obtaining the virtual agent upgrade data from the application server further comprises executing the upgrade script in the computing entity using the upgrade proxy service and downloading an upgrade package for the virtual agent from the application server.

16. The non-transitory computer-readable storage medium of claim 15, wherein upgrading the virtual agent based on the virtual agent upgrade data comprises using the upgrade proxy service, upgrading a component or a configuration of the virtual agent based on the upgrade package.

17. The non-transitory computer-readable storage medium of claim 15, wherein the steps further comprise, using the upgrade proxy service, creating a backup of the virtual agent before upgrading the virtual agent.

18. The non-transitory computer-readable storage medium of claim 15, wherein the steps further comprise, using the upgrade proxy service, stopping the virtual agent from operating.

19. The non-transitory computer-readable storage medium of claim 15, wherein the steps further comprise, using the upgrade proxy service, transmitting virtual agent upgrade status information to the application server.

20. A system for virtual agent upgrade, the system comprising:

memory; and
one or more processors configured to:
  receive an upgrade request for a virtual agent in a computing entity from an application server;
  in response to the upgrade request, instantiate an upgrade proxy service in the computing entity by the virtual agent in the computing entity;
  using the upgrade proxy service, obtain virtual agent upgrade data from the application server;
  using the upgrade proxy service, upgrade the virtual agent based on the virtual agent upgrade data, wherein the upgrade proxy service acts as a point of contact for the application server to monitor an upgrade status of the virtual agent when a virtual agent upgrade is in progress; and
  remove the upgrade proxy service from the computing entity after upgrading the virtual agent.

\* \* \* \* \*